United States Patent
Huin et al.

(10) Patent No.: US 8,160,250 B2
(45) Date of Patent: Apr. 17, 2012

(54) MONITORING USAGE OF ENCRYPTED BROADCAST SERVICES

(75) Inventors: Steeve Huin, Hoofddorp (NL); Werner Stephanus Strydom, Amsterdam (NL)

(73) Assignee: Irdeto B.V. (NL)

( * ) Notice: Subject to any disclaimer, the term of this patent is extended or adjusted under 35 U.S.C. 154(b) by 408 days.

(21) Appl. No.: 12/506,288

(22) Filed: Jul. 21, 2009

(65) Prior Publication Data

US 2010/0020969 A1      Jan. 28, 2010

(30) Foreign Application Priority Data

Jul. 24, 2008   (EP) ..................... 08161072

(51) Int. Cl.
    *H04N 7/167*   (2011.01)
(52) U.S. Cl. ....................... 380/231; 380/233
(58) Field of Classification Search .................. 380/230, 380/231, 233, 239; 725/1, 2, 4
    See application file for complete search history.

(56) References Cited

U.S. PATENT DOCUMENTS

| | | | |
|---|---|---|---|
| 6,633,644 B2 * | 10/2003 | Van Rijnsoever et al. | 380/239 |
| 7,380,135 B2 | 5/2008 | Nishimoto et al. | |
| 2004/0101138 A1 * | 5/2004 | Revital et al. | 380/210 |
| 2006/0155989 A1 * | 7/2006 | Nishimoto et al. | 713/166 |

FOREIGN PATENT DOCUMENTS

| | | |
|---|---|---|
| EP | 0977389 A2 | 2/2000 |
| EP | 1501304 A1 | 1/2005 |

OTHER PUBLICATIONS

"European Application Serial No. 08161072.7, European Search Report mailed May 8, 2009", 7 pgs.

* cited by examiner

*Primary Examiner* — Edward Zee
(74) *Attorney, Agent, or Firm* — Schwegman, Lundberg & Woessner, P.A.

(57) ABSTRACT

Embodiments include a method and system for monitoring usage of an encrypted broadcast service, such as an encrypted television program, in a secure client module such as a SIM card. An encrypted entitlement control message is received from a head-end system via the intermediary of a client device. A service identifier indicative of the encrypted broadcast service is obtained from the decrypted entitlement control message and, in dependence of the decrypted entitlement control message, status data being indicative of a status of the broadcast service is generated. The service identifier and the status data are stored in a memory of said secure client module and can be transmitted to an external server.

11 Claims, 3 Drawing Sheets ically monitored by a vendor specific monitoring module in the client device. The monitoring module captures requests from the end-user for a broadcast service to generate a usage report for the broadcast service. Requests are e.g. made by using a remote control on the client device and by choosing services from an electronic service guide presented to the end-user on the end-user device. For deriving the status of the broadcast service, vendor specific triggers, as implemented by the vendor in the client device, are used.

There is a need in the art for a non-vendor specific solution of monitoring usage of encrypted broadcast services.

SUMMARY OF THE INVENTION

According to various embodiments, a method is proposed for monitoring usage of an encrypted broadcast service in a secure client module. The secure client comprises a memory and is communicatively linked to a client device. The method comprises receiving an encrypted entitlement control message from the client device. The method further comprises decrypting the encrypted entitlement control message. The method further comprises obtaining a control word from the decrypted entitlement control message. The method further comprises transmitting the control word to the client device for decrypting the encrypted broadcast service. The method further comprises obtaining a service identifier from the decrypted entitlement control message. The service identifier is indicative of the encrypted broadcast service. The method further comprises generating, in dependence of the decrypted entitlement control message, status data being indicative of a status of the broadcast service. The method further comprises storing the service identifier and the status data in the memory of said secure client module.

According various embodiments, a secure client module is proposed to monitor usage of an encrypted broadcast service. The secure client module is communicatively linked to a client device. The secure client module comprises a memory. The secure client module further comprises a receiver module configured to receive an encrypted entitlement control message. The secure client module further comprises a decryptor configured to decrypt the encrypted entitlement control message. The secure client module further comprises a processing module. The secure client module further comprises a first transmitter module configured to provide a control word to the client device for decrypting the encrypted broadcast service. The processing module is configured to obtain the control word and a service identifier from the decrypted entitlement control message. The service identifier is indicative of the encrypted broadcast service. The processor module is further configured to generate, in dependence of the decrypted entitlement control message, status data being indicative of a status of the broadcast service. The processor module is further configured to store the service identifier and the status data in the memory.

Thus, the method advantageously enables a non-vendor specific monitoring of usage of encrypted broadcast services in a secure client module, using entitlement control messages as input for the monitoring.

The embodiments of claims 2 and 8 advantageously enable detection of a start or an end of the broadcast service.

The embodiments of claims 3 and 9 advantageously enable an alternative detection of an end of the broadcast service.

The embodiments of claims 4 and 10 advantageously enable enabling or disabling the monitoring of usage of the encrypted broadcast service identified by the service identifier.

The embodiments of claims 5 and 11 advantageously enable the secure client module to transmit the service identifier and status data to an external server as identified in the entitlement management message.

The embodiments of claims 6 and 12 advantageously enable enabling or disabling the monitoring of usage of all broadcast services.

The embodiment of claim 13 advantageously enables a SIM card in a mobile phone to perform the monitoring of usage of an encrypted broadcast service.

According to various embodiments, a control signal comprising an encrypted entitlement control message is proposed to enable monitoring usage of an encrypted broadcast service in a secure client module. The encrypted entitlement control message is decryptable by the secure client module. The encrypted entitlement control message comprises a control word to decrypt the encrypted broadcast service. The encrypted entitlement control message further comprises a service identifier being indicative of the encrypted broadcast service. The encrypted entitlement control message further comprises a monitoring instruction to enable or disable storing of the service identifier and status data being indicative of a status of the broadcast service in the secure client.

Thus, the control signal advantageously enables the secure client module to monitor usage of the encrypted broadcast service identified by the service identifier.

According to various embodiments, a management signal comprising an encrypted entitlement management message is proposed to enable monitoring usage of an encrypted broadcast service in a secure client module. The encrypted entitlement management message is decryptable by the secure client module. The encrypted entitlement management message comprises a network address of an external server operable to enable the secure client module to transmit a service identifier being indicative of the encrypted broadcast service and status data being indicative of a status of the broadcast service to the external server using the network address.

Thus, the management signal advantageously enables the secure client module to transmit the service identifier and status data to an external server as identified in the entitlement management message.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
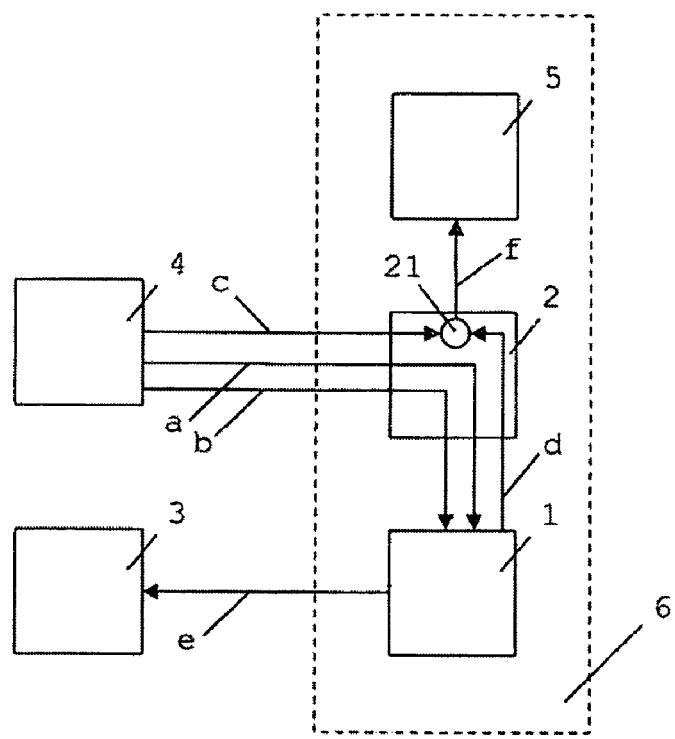
FIG. 1 shows a conditional access system of an embodiment of the invention.

The conditional access system shown in FIG. 1 comprises a head-end system 4, where a television program is encrypted such that an entitled client device 2 is able the decrypt the encrypted broadcast services using a secure client module 1. In the example of FIG. 1 the secure client module 1, the client device 2 and a playback module 5 are integrated into a single end-user device 6. The single end-user device 6 is e.g. a smartphone. The secure client module 1 is e.g. a SIM card, which is detachably connected to the client device 2. The playback module 5 is e.g. a mobile television application in the smartphone. The client device 2 is communicatively linked to a communication module (not shown in FIG. 1) of the smartphone to receive data from the head-end system 4. This enables, in case of a smartphone as single end-user device, communication with the head-end system in accordance with e.g. a mobile phone standard such as GSM, GPRS or UMTS, and/or a mobile broadcast standard such as DVB-H.

Other examples of single end-user devices are a mobile phone, PC, notebook, or any other end-user device integrating the functionality of a secure client module 1, client device 2 and play back module 5. Depending on the type of single end-user device 6, the secure client module 1 can be implemented as a SIM card, smartcard, surface mounted device, or any other device implementing the functionality of the secure client module. It is possible that the secure client module 1, client device 2 and play back module 5 are separate modules, i.e. not integrated into a single end-user device, or only partly integrated.

The head-end system 4 transmits the encrypted television program in an encrypted broadcast signal (indicated by 'c') to the client device 2. An EMM is transmitted in a management signal (indicated by 'b') from the head-end system 4 to the SIM card 1 via the intermediary of the client device 2. The EMM enables the SIM card 1 to decrypt ECMs transmitted in a control signal (indicated by 'a') from the head-end system 4 to the SIM card 1 via the intermediary of the client device 2. The SIM card 1 decrypts the ECMs to obtain CWs. The CWs are subsequently transmitted in a control word signal (indicated by 'd') to a decryptor 21 in the client device 2. Decryptor 21 decrypts the encrypted television program using the received CWs and the decrypted television program is provided in a decrypted broadcast signal (indicated by 'f') to the mobile television application 5 for playback.

The signals a, b, c, d and f are typically suitable for carrying data packets. This also applies to signal e, which will be explained below.

To allow the television program to be decrypted without delays, the ECMs—and thus the CWs—are transmitted synchronously with the encrypted television program. A service identifier (SID) in the ECM indentifies the television program that is associated with the CWs.

Each time that the SIM card receives a new ECM, it is derived that the end-user is viewing the television program identified by the SID. This derived information is used in the SIM card for monitoring the usage of the encrypted broadcast service, i.e. in the example of FIG. 1 for monitoring the watching of the television program in the mobile television application 5.

Figure 2:
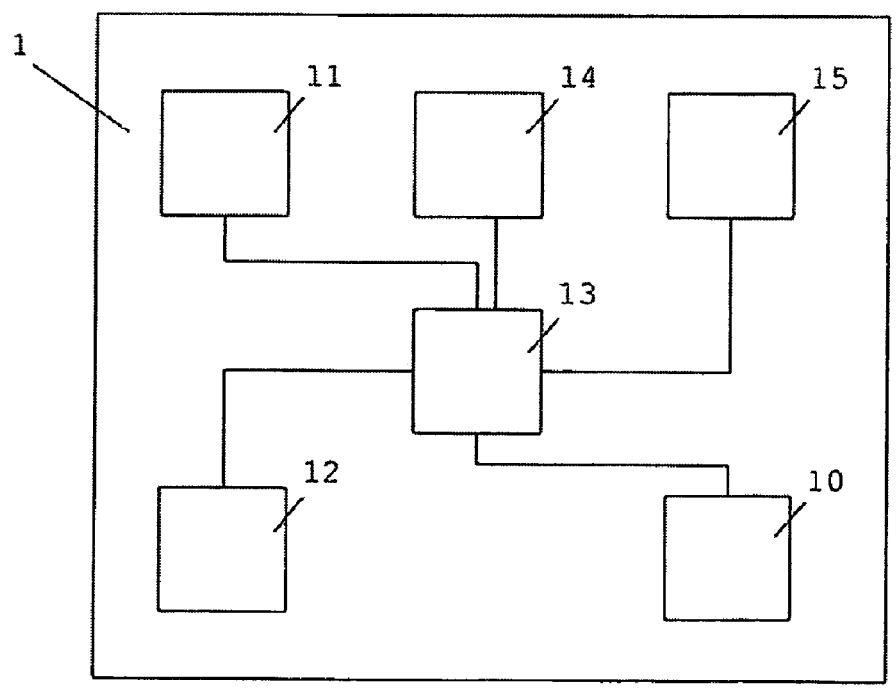
FIG. 2 shows a secure client module of an embodiment of the invention.

In FIG. 2 a secure client module 1 is shown in more detail. The secure client module 1 is e.g. implemented as a SIM card for use in a smartphone 6. The SIM card 1 comprises a memory 10, a receiver module 11, a decryptor 12, a first transmitter module 14, a second transmitter module 15 and a central processing module 13.

In the example of FIG. 2 the central processing module 13 interconnects memory 10, receiver module 11, decryptor 12, first transmitter module 14, and second transmitter module 15. Other configurations are possible where one or more of the modules are directly connected or where modules are interconnected via another module. It is possible that there is only one transmitter module functioning as both first transmitter module 14 and second transmitter module 15.

An ECM is received from the head-end system 4 via the intermediary of client device 2 in receiver module 11. The decryptor 12 decrypts the ECM using an ECM decryption key stored in the memory 10. The ECM decryption key required for decrypting the ECM is e.g. obtained in the past from an EMM received from the head-end system 4 via the intermediary of the client device 2 in the receiver module 11.

From the decrypted ECM one or more CWs and the SID are obtained. The CWs are transmitted via the first transmitter module 14 to the decryptor 21 for decrypting the encrypted television program identified by the SID.

The processing module 13 keeps track of the ECMs received and generates status data being indicative of the status of the viewing of the television program in the mobile television application 5. The status data comprises e.g. an indication that and when the television program is being viewed. Together with the SID the status data is stored in the memory 10 for later use.

Optionally, processing module 13 compares the SID obtained from the ECM with the latest SID stored in the memory 10. If the SID obtained from the ECM differs from the latest SID stored in the memory 10, then it is derived that another television program has started. For the television program identified by the SID stored in the memory 10 it is concluded that viewing of that television program has ended. For the television program identified by the SID obtained from the ECM it is concluded that viewing of that television program has started. Status data is generated indicating that the previous television program has ended and a new television program has started. The status data is stored in the memory 10 together with the corresponding SIDs.

ECMs are received in a predefined time interval called a crypto-period. Typically the crypto-period is set to 30 seconds, but other settings are possible. The CWs received with an ECM can be used for 30 seconds by decryptor 21 to decrypt the encrypted television program. After 30 seconds the television program will be encrypted using another CW, which has to be obtained from a new ECM. Optionally, if no ECM is received 30 seconds after having received the previous ECM, it is concluded that the end-user stopped watching the television program. The latest SID stored in the memory 10 is used to identify the television program that the end-user stopped watching. Status data is generated indicating that the end-user stopped watching the television program identified by the SID. The status data is stored in the memory 10 together with the SID.

Optionally, the ECM comprises a first monitoring instruction, e.g. in the form of a specific bit pattern. When the processing module 13 detects the specific bit pattern in the decrypted ECM, no status data will be generated and stored. Thus the head-end system 4 can enable or disable the monitoring of the usage of encrypted broadcast services on a per service basis. If e.g. only sport television programs are to be monitored, all ECMs except for the ECMs associated to the sport television programs contain the specific bit pattern.

Alternatively the specific bit pattern is present in ECMs associated to television programs that are to be monitored and upon detection of the bit pattern the status data will be generated. ECMs without the specific bit pattern cause the associated television program not to be monitored. Yet in another alternative both ECMs associated with television programs to be monitored and ECMs associated with television programs not to be monitored contain a specific bit pattern, which bit pattern indicates whether or not to monitor the associated television program.

The status data stored in the memory 10 is transmitted to an external server 3 using the second transmitter module 15 of the SIM card 1. In FIG. 1 this is indicated by a status signal (indicated by 'e') that carries the status data from the SIM card 1 to the external server 3. The status data is transmitted when the memory 10 is full, at a predefined time interval, or at a predefined time. After transmitting the status data, the memory 10 can be reused for storing new status data.

It is possible that the status data is transmitted to the external server 3 without using the client device 2. Alternatively the status data is transmitted to the external server 3 transparently via the intermediary of the client device 2. The second transmitter module 15 or client device 2 is thereto communicatively linked to a communication module (not shown in the figures) of the smartphone 6, enabling, in case of a smartphone as single end-user device 6, communication with the head-end system in accordance with e.g. a mobile phone standard such as GSM, GPRS or UMTS.

The status data can be transmitted as raw data, i.e. as stored in the memory 10, or in any structured data format. In various embodiments, the status data is transmitted in a mark-up language such as XML or HTML.

The address used by the SIM card 1 to address the external server 3 is, in various embodiments, obtained from an EMM received from the head-end system 4 via the intermediary of the client device 2. The EMM is received in the SIM card by the receiver module 11. Decryptor 12 decrypts the EMM using an EMM decryption key pre-stored on the SIM card, e.g. in the memory 10 or a read-only-memory (ROM) module not shown in FIG. 2. The processing unit 13 obtains the network address from the decrypted EMM and uses this address when transmitting the status data to the external server 3. The memory 10 is typically used for storing the network address.

Optionally, the EMM comprises a second monitoring instruction, e.g. in the form of a specific bit pattern. When the processing module 13 detects the specific bit pattern in the decrypted EMM, the monitoring of usage of encrypted broadcast services is disabled for all services.

Figure 3:
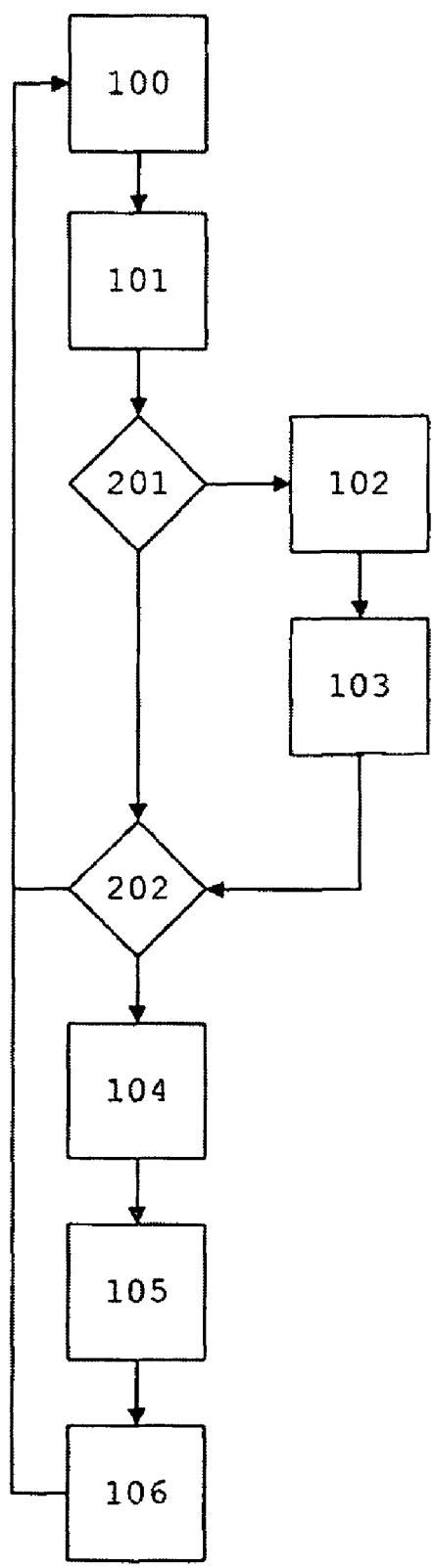
FIG. 3 shows a schematic view of a method of an embodiment of the invention.

In FIG. 3 a method for monitoring usage of an encrypted broadcast service, such as watching an encrypted television program, in a secure client module 1 are shown.

To obtain the CWs for decrypting the encrypted television program, in 100 an encrypted ECM is received from the head-end system 4 via the intermediary of the client device 2. The ECM is decrypted in 101 and—if a CW is present in the ECM, which is determined in 201—the CW is obtained from the decrypted ECM and transmitted to decryptor 21 in the client device 2 in 102 and 103.

In 202 it is determined if there is a SID in the ECM. If this is the case, then the SID is obtained from the decrypted ECM in 104 and status data is generated for the television program identified by the SID in 105. The status data and SID are stored in the memory 10 in 106.

It is possible to skip one or more operations as described, e.g., the determination 201 and 202 are optionally not performed, resulting in all the other operations always being performed. It is possible to alter the order of the operations. 102 and 103 can e.g. be performed after 104. It is possible to perform operations in parallel. 102 and 103 can e.g. be performed in parallel to 104, 105 and 106.

Figure 4:
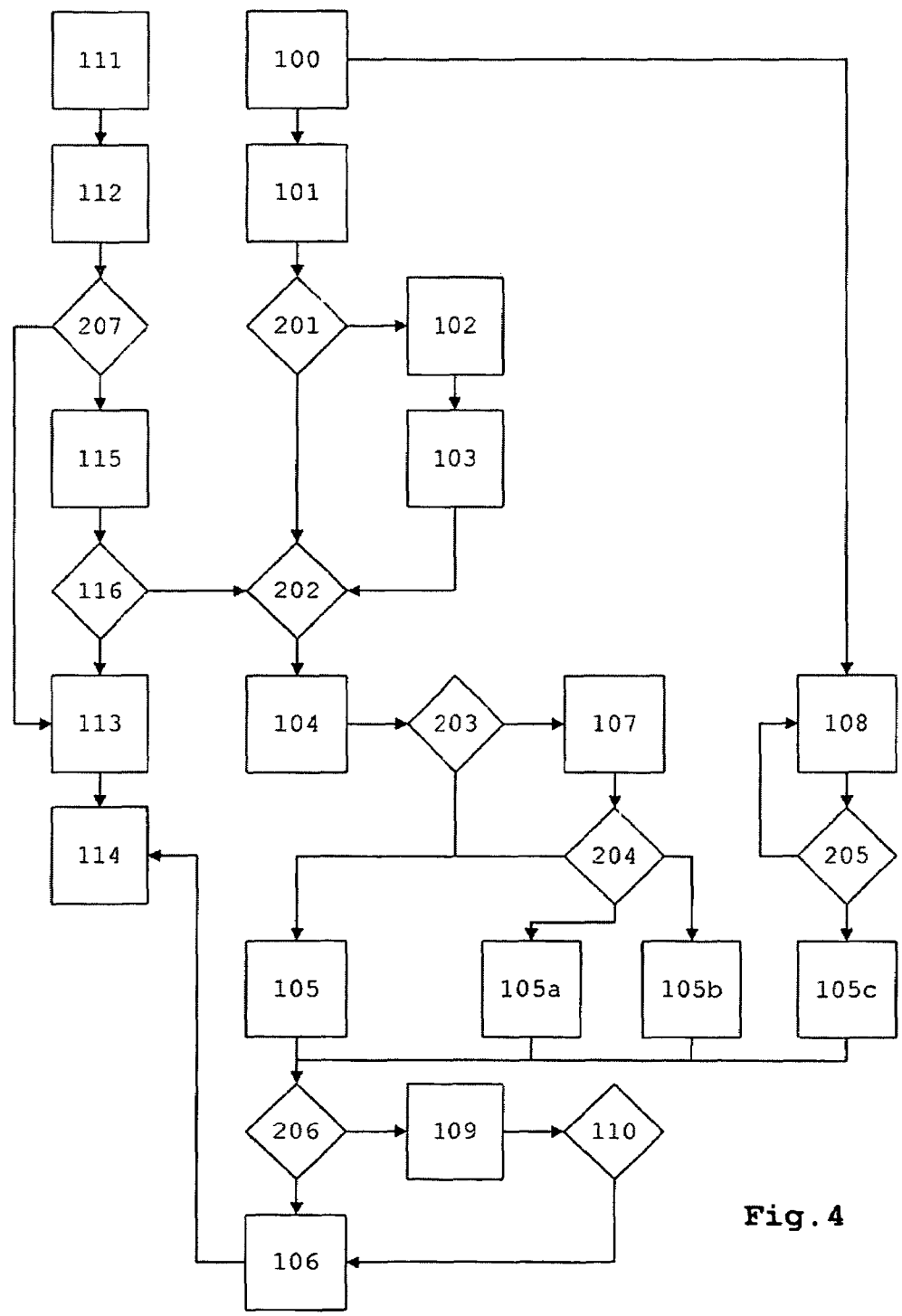
FIG. 4 shows a schematic view of a method of an embodiment of the invention.

In FIG. 4 a more complex example is given of a method for monitoring usage of an encrypted broadcast service, such as watching an encrypted television program, in a secure client module 1.

100-106 and 201-202 are similar to the operations described for FIG. 3. In the example of FIG. 4 in 203 it is determined if a SID has been received in a previous ECM. If this is not the case, then the procedure continues with 105 as described for FIG. 3. If this is the case, then in 107 the currently received ECM is compared with the previously received SID.

If the SID obtained from the ECM differs from the latest SID stored in the memory 10, then it is derived that another television program has started. For the television program identified by the SID stored in the memory 10 it is concluded that viewing of that television program has ended. For the television program identified by the SID obtained from the ECM it is concluded that viewing of that television program has started. Status data is generated indicating that the previous television program has ended (105*b*) and a new television program has started (105*a*).

In 206 it is determined if a first monitoring instruction is present in the ECM. If this is the case, the first monitoring instruction is obtained from the decrypted ECM in 109. Depending on the value of the first monitoring instruction, which is determined in 110, the SID and status data is stored in the memory 10.

After receiving the ECM in 100, the amount of time lapsed since receiving the ECM can be tracked. This is indicated by 108 where the amount of time is calculated. In 205 it is determined if the amount of time lapsed exceeds a predefined amount of time. If this is the case, then in 105c the status data is set to indicate that watching the television program has ended.

At any time an EMM can be received, which is indicated by 111. In 112 the EMM is decrypted. In 207 it is determined if there is a second monitoring instruction present in the EMM. If this is the case, then in 115 the monitoring instruction is obtained from the EMM, and depending on the value of the monitoring instruction, which is determined in 116, the monitoring of usage of broadcast services is enabled or disabled for all services. In case monitoring is to be disabled, a signal is e.g. given to 202 to stop the process there.

If the EMM contains a network address of an external server 3, then this address is obtained from the decrypted EMM in 113. This network address is used in 114 to address the external server 3 when transmitting the SID and status data.

The order of the operations in FIG. 4 is an example of how to implement the method for monitoring usage of an encrypted broadcast service in a secure client module 1. In various embodiments, it is possible to omit one or more of these operations, alter the order of the operations, and one or more of these operations can be performed in parallel.

What is claimed is:

1. A method for monitoring usage of an encrypted broadcast service in a secure client module comprising a memory and being communicatively linked to a client device, the method comprising:
   receiving an encrypted first entitlement control message from the client device;
   decrypting the encrypted first entitlement control message;
   obtaining a control word from the decrypted first entitlement control message and transmitting the control word to the client device for decrypting the encrypted broadcast service;
   obtaining a first service identifier from the decrypted first entitlement control message, the first service identifier being indicative of the encrypted broadcast service;
   generating, in dependence of the decrypted first entitlement control message, status data being indicative of a status of the broadcast service;
   storing the first service identifier and the status data in the memory of said secure client module; and
   comparing the first service identifier with a second service identifier from a second entitlement control message;
   wherein if the first service identifier differs from the second service identifier and the decrypted first entitlement control message is received after the second entitlement control message, setting the status data to indicate that usage of the broadcast service has started; and
   wherein if the first service identifier differs from the second service identifier and the decrypted first entitlement control message is received before the second entitlement control message, setting the status data to indicate that usage of the broadcast service has ended.

2. The method according to claim 1, further including:
   calculating an amount of time lapsed since receiving the decrypted first entitlement control message, and wherein, if the amount of time lapsed exceeds a predefined amount of time, setting the status data to indicate that usage of the broadcast service has ended.

3. The method according to claim 1, further including:
   obtaining a first monitoring instruction from the decrypted first entitlement control message and enabling or disabling the storing of the first service identifier and the status data in response to the first monitoring instruction.

4. The method according to claim 1, further including:
   receiving an encrypted entitlement management message from the client device;
   decrypting the encrypted entitlement management message;
   obtaining a network address of an external server from the decrypted entitlement management message; and
   transmitting the first service identifier and the status data to the external server using the network address.

5. The method according to claim 4, further including:
   obtaining a second monitoring instruction from the decrypted entitlement management message; and
   enabling or disabling monitoring of usage of broadcast services in response to the second monitoring instruction.

6. A secure client module for monitoring usage of an encrypted broadcast service, the secure client module being communicatively linked to a client device, the secure client module comprising:
   a memory;
   a receiver module configured to receive an encrypted first entitlement control message;
   a decryptor configured to decrypt the encrypted first entitlement control message;
   a processing module;
   a first transmitter module configured to provide a control word to the client device for decrypting the encrypted broadcast service, wherein the processing module is configured to:
   obtain the control word and a first service identifier from the decrypted first entitlement control message, the first service identifier being indicative of the encrypted broadcast service;
   generate, in dependence of the decrypted first entitlement control message, status data being indicative of a status of the broadcast service; and
   store the first service identifier and the status data in the memory, wherein the processing module is further configured to compare the first service identifier with a second service identifier from a second entitlement control message, and to set the status data to indicate that usage of the broadcast service has started if the first service identifier differs from the second service identifier and the decrypted first entitlement control message is received after the second entitlement control message, and to set the status data to indicate that usage of the broadcast service has ended if the first service identifier differs from the second service identifier and the decrypted first entitlement control message is received before the second entitlement control message.

7. The secure client module according to claim 6, wherein the processing module is further configured to calculate an amount of time lapsed since receiving the encrypted first entitlement control message, and to set the status data to indicate that usage of the broadcast service has ended if the amount of time lapsed exceeds a predefined amount of time.

8. The secure client module according to claim 6, wherein the processing module is further configured to obtain a first monitoring instruction from the decrypted first entitlement control message, and to enable or disable the storing of the first service identifier and the status data in response to the first monitoring instruction.

9. The secure client module according to claim 6, further including:
- a second transmitter module configured to transmit the first service identifier and the status data to an external server using a network address, and
- wherein the receiver module is further configured to receive an encrypted entitlement management message, the decryptor is further configured to decrypt the encrypted entitlement management message, and the processing module is further configured to obtain the network address of the external server from the decrypted entitlement management message.

10. The secure client module according to claim 9, wherein the processing module is further configured to obtain a second monitoring instruction from the entitlement management message and to enable or disable monitoring of usage of broadcast services in response to the second monitoring instruction.

11. The secure client module according to claim 6, wherein the client device is a mobile phone and the secure client module is a SIM card that is detachably connected to the mobile phone.

* * * * *